(12) United States Patent
Horiuchi et al.

(10) Patent No.: US 7,084,383 B2
(45) Date of Patent: Aug. 1, 2006

(54) IMAGE PROCESSING APPARATUS

(75) Inventors: Kazuhito Horiuchi, Kamiina-gun (JP); Shunsuke Kurata, Kamiina-gun (JP)

(73) Assignee: Olympus Corporation, Tokyo (JP)

(*) Notice: Subject to any disclaimer, the term of this patent is extended or adjusted under 35 U.S.C. 154(b) by 270 days.

(21) Appl. No.: 10/452,437

(22) Filed: Jun. 2, 2003

(65) Prior Publication Data

US 2004/0046102 A1    Mar. 11, 2004

(30) Foreign Application Priority Data

Jun. 3, 2002    (JP) ............................. 2002-161586

(51) Int. Cl.
*G02B 7/04* (2006.01)

(52) U.S. Cl. ............... 250/201.2; 250/201.3; 250/201.4

(58) Field of Classification Search ............ 250/208.1, 250/201.3, 201.5, 201.7, 201.2, 201.4; 348/294; 396/79
See application file for complete search history.

(56) References Cited

U.S. PATENT DOCUMENTS

| 5,151,609 | A  | * | 9/1992  | Nakagawa et al. .... 250/559.22 |
| 5,787,208 | A  | * | 7/1998  | Oh et al. .................... 382/257 |
| 6,232,588 | B1 | * | 5/2001  | Naya ....................... 250/208.1 |
| 6,330,066 | B1 | * | 12/2001 | Tanaka et al. .............. 356/609 |

* cited by examiner

*Primary Examiner*—Georgia Epps
*Assistant Examiner*—Don Williams
(74) *Attorney, Agent, or Firm*—Scully, Scott, Murphy & Presser, P.C.

(57) ABSTRACT

An object image data obtained by image taking by an image taking device, while a distance between a stage, on which an object is placed, and the image taking device is varied, is captured by a focus processing device at each predetermined timing. The focus processing device retrieves contrast data indicating a maximum value from the captured respective object image data, and stores the object image data in the image information memory. The object image data of the contrast data indicating the maximum value is read from the image information memory, and outputted and displayed on a display section.

21 Claims, 4 Drawing Sheets

IMAGE PROCESSING APPARATUS

CROSS-REFERENCE TO RELATED APPLICATIONS

This application is based upon and claims the benefit of priority from the prior Japanese Patent Application No. 2002-161586, filed Jun. 3, 2002, the entire contents of which are incorporated herein by reference.

BACKGROUND OF THE INVENTION

1. Field of the Invention

This invention relates to an image processing apparatus which obtains an image focused on an object.

2. Description of the Related Art

For example, a defect inspection is performed for large-size glass substrates and semiconductor wafers used for a liquid crystal display (hereinafter referred to as "LCD") or a plasma display panel (hereinafter referred to as "PDP"). In the defect inspection thereof, image data is obtained by an image processing apparatus by taking images of large-size glass substrates and semiconductor wafers by an image-taking device such as a CCD camera. With respect to the image data, it is necessary to focus the image-taking device on large-size glass substrates and semiconductor wafers to improve the accuracy of the defect inspection.

As a method of obtaining focused image data, for example, an object such as a large-size glass substrate or a semiconductor wafer is placed on a stage, a CCD camera is arranged above the object so as to be opposed to the object, and the stage is moved in a Z-axis direction to focus the CCD camera on the object.

For example, the CCD camera is set to take an image each time step movement of the stage is stopped, and a plurality of image data are obtained.

A contrast of image data obtained by taking an image of the object becomes higher as the CCD camera is more focused on the object. Therefore, a device which controls the stage and the CCD camera retrieves image data having the highest contrast among the obtained plurality of image data, reads information of the height of the stage at which the image data was obtained, and controls the height of the stage in accordance with the height information. Thereby, the object on the stage is adjusted to the focus position of the CCD camera, and focused image data of the object is obtained.

In the field of manufacturing LCDs, PDPs or semiconductor wafers, there is a demand of shortening a tact time of manufacturing them. With the demand, it is also desired to shorten the time required for defect inspections for large-size glass substrates and semiconductor wafers, etc. used for LCDs or PDPs. Therefore, it is necessary to shorten time of obtaining the focused image data.

However, in the above method, the stage-and-CCD-camera controlling device is required to transmit to the stage a command to move the stage for each predetermined pitch, and transmit to the CCD camera a command to take an image, while checking the operation of the stage and the image-taking operation of the CCD camera. Further, together with these operations, the stage-and-CCD-camera controlling device is required to perform processing such as taking image data. Therefore, the stage-and-CCD-camera controlling device is required to perform enormous amounts of processing, and takes much time to obtain a plurality of image data.

BRIEF SUMMARY OF THE INVENTION

According to a main aspect of the present invention, there is provided an image processing apparatus comprising: a stage on which an object is placed; an image taking device which takes an image of the object; a movement control section which varies a distance between the stage and the image taking device; a focus processing device which captures image data from the image taking device at each predetermined timing while varying the distance between the stage and the image taking device by the movement control section, and judges the image data of the object in which contrast data of the image data has a maximum as focused; an image information memory which stores the image data of the object judged as focused; and a display section which displays the image data of the object judged as focused from the image information memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to drawings.

Figure 1:
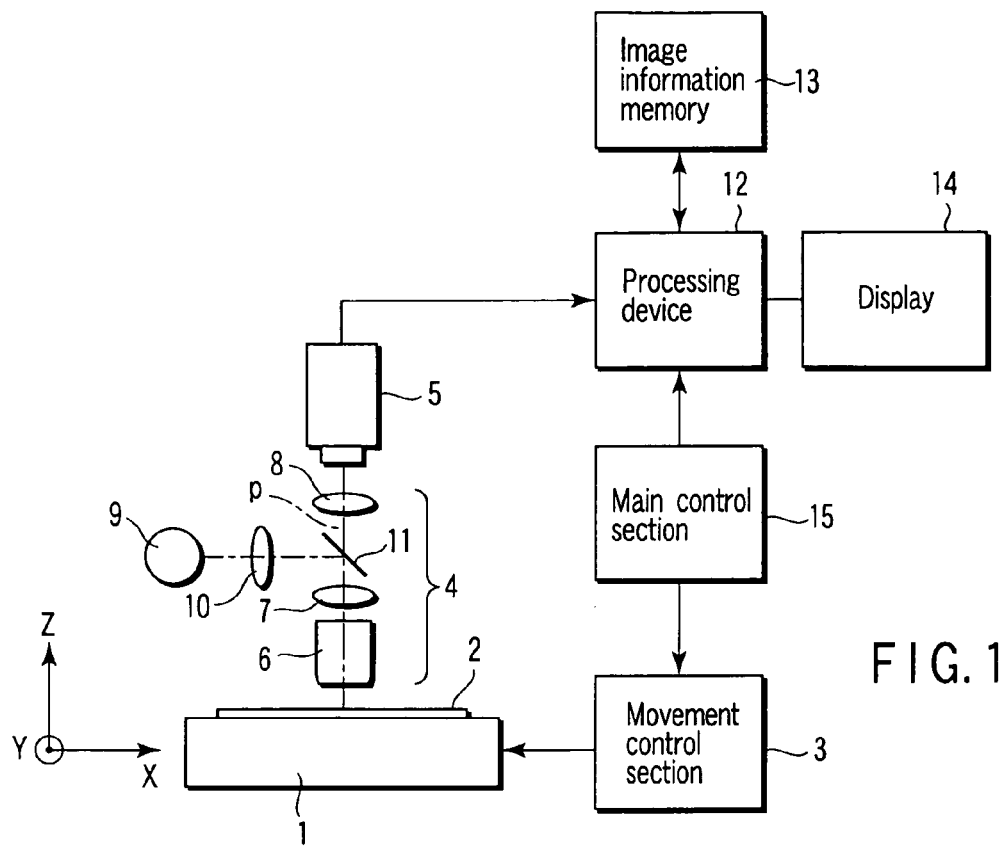
FIG. 1 is a structural diagram showing an embodiment of an image processing apparatus according to the present invention.

FIG. 1 is a structural diagram of an image processing apparatus. On an XYZ stage 1, a large-size glass substrate 2 for an LCD, for example, is placed as an object.

The XYZ stage 1 has an X-direction motor, an Y-direction motor, and a Z-direction motor, which move in an X, Y and Z direction, respectively. The motors are direct-current motors or alternating-current motors. The motors can perform a constant speed drive and micro-step drive. The XYZ stage 1 is driven and controlled in response to a movement command generated by a movement control section 3. The movement control section 3 transmits a movement command to the XYZ stage 1 to ascend or descend in the Z direction.

The XYZ stage 1 ascends or descends in the Z direction at low and constant speed continuously, or at predetermined pitches, by drive of the Z-direction motor which has received a Z-directional movement command. Together with the movement, the movement control section 3 recognizes height information (Z coordinate) of the XYZ stage 1 which ascends or descends continuously.

A CCD camera 5 is provided above the XYZ stage 1 with an observing optical system 4 intervened therebetween. The observing optical system 4 has an objective lens 6 and lenses 7 and 8, which are arranged on an optical axis p. Illuminating light outputted from a lighting device 9 is made incident on a half mirror 11 through a lens 10. The half mirror 11 is provided on the optical axis p of the observing optical system 4. Thereby, the illuminating light outputted from the lighting device 9 is reflected downward by the half mirror 11, and irradiated onto the large-size glass substrate 2 through the lens 7 and the objective lens 6. The CCD camera 5 picks up an image of the large-size glass substrate 2 placed on the XYZ stage 1, and outputs an image signal.

A focus processing device 12 is connected with an image information memory 13, a display 14 and a main control section 15. The focus processing section 12 has a first mode and a second mode in an operation of focusing on the large-size glass substrate 2.

The first mode will now be explained.

Figure 2:
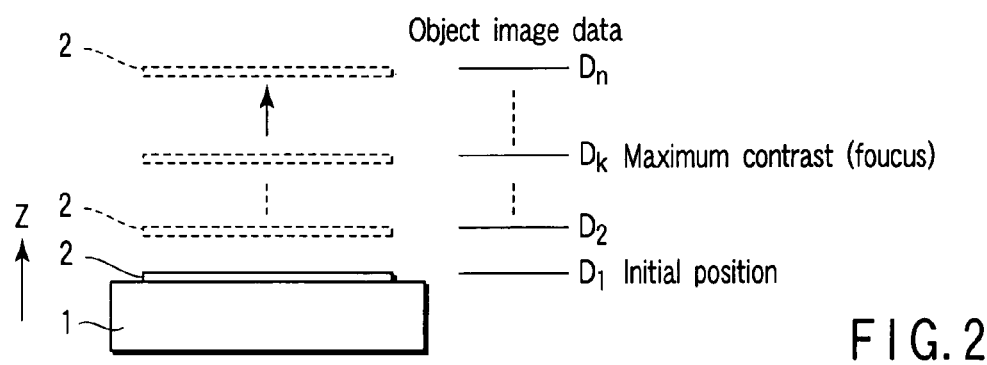
FIG. 2 is a diagram showing acquisition of an object image data in the embodiment of the image processing apparatus according to the present invention.

The XYZ stage 1 continuously ascends in the Z direction at a constant speed, as shown in FIG. 2. An image signal outputted from the CCD camera 5 during continuous ascent of the XYZ stage 1 is inputted in the focus processing device 12, and the focus processing device 12 captures one still image at each predetermined timing by an image capture. The focus processing device 12 stores data of the captured still images (hereinafter referred to as "object image data") $D_1, D_2, \ldots, D_k, \ldots, D_n$ (hereinafter represented by "$D_n$") in order in an image capture buffer memory region in the image information memory 13.

Further, as another method, it is possible to store images, taken by the CCD camera 5, in order in the image capture buffer memory region at timing of each predetermined pitch, while the XYZ stage 1 is raised at predetermined pitches.

Each time the focus processing device 12 successively stores the object image data $D_n$ in the image capture buffer memory region, it forms contrast data $C_1, C_2, \ldots, C_k, \ldots, C_n$ (hereinafter represented by $C_n$) of respective object image data $D_n$.

The contrast data $C_n$ is calculated by sampling a shading value of the image from the whole object image data, or a preset sampling region (sampling pattern) in the object image data.

Figure 3:
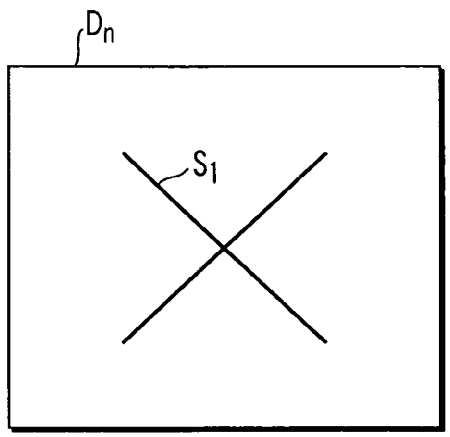
FIG. 3 is a diagram showing a sampling pattern of shading values when contrast data is made.
Figure 4:
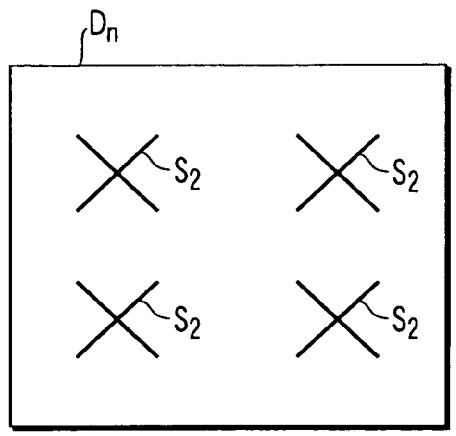
FIG. 4 is a diagram showing a sampling pattern of shading values when contrast data is made.

Each of FIGS. 3 and 4 shows an example of a sampling pattern of a shading value at the time of preparing contrast data. In FIG. 3, a sampling pattern $S_1$ having an "X" shape is set in a central portion of the object image data $D_n$. In FIG. 4, a sampling pattern $S_2$ having an "X" shape is set in plural parts, for example, four parts, of the object image data $D_n$.

The sampling patterns $S_1$ and $S_2$ are used for the following reason. If a defective portion exists on the surface of the large-size glass substrate 2, the shading value on the object image data $D_n$ differs from a shading value of image data of a normal large-size glass substrate. If a defective portion exists on the sampling pattern, the contrast data $C_n$ is not accurately formed. Therefore, each of the sampling patterns $S_1$ and $S_2$ are selected so as not to be influenced by defective portions.

Further, if a sampling pattern $S_2$ is formed in plural parts of the object image data $D_n$ as shown in FIG. 4, each of the contrast data formed for respective sampling patterns $S_2$ may be weighted.

The sampling patterns are not limited to those in FIGS. 3 and 4, but may be set with any pattern shape in any position in the object image data $D_n$. The contrast data $C_n$ may be formed on the basis of the shading value of all the pixels for each of the object image data $D_n$. The contrast data may be formed by superposing one or plural slits on the object image data, and on the basis of the shading values of the pixels in the slit(s). Any method may be used as a method of forming contrast.

When the focus processing device 12 has formed the contrast data $C_n$ for respective object image data $D_n$, it determines contrast data indicating a final maximum value (hereinafter referred to as "the maximum value") in the contrast data $C_n$, i.e. contrast data $C_k$, as being focused.

The focus processing device 12 determines the contrast data $C_k$ having the maximum as follows, for example. The contrast data $C_1$ of the object image data $D_1$ is formed, and the contrast data $C_1$ is stored in the contrast memory region in the image information memory 13. In this case, the contrast data $C_1$ is stored in the image information memory 13 in association with the object image data $D_1$.

Next, the contrast data $C_2$ of the object image data $D_2$ is formed, and then the contrast data $C_2$ newly stored in this step is compared with the contrast data $C_1$ of the object image data $D_1$, which has already been stored in the contrast memory region.

As a result of the comparison, if the contrast data $C_2$ newly stored is greater than the contrast data $C_1$, the maximum value stored in the contrast memory region is renewed to the newly-stored contrast data $C_2$.

Thereafter, each time the object image data $D_3, \ldots, D_k, \ldots, D_n$ are successively taken, the renewed previous contrast data is compared with each of respective contrast data $C_3, \ldots, C_k, \ldots, C_n$ of the newly taken object image data $D_3, \ldots, D_k, \ldots, D_n$, and the contrast data is renewed to the greater contrast data as the contrast data of the maximum value.

As a result, the focus processing device 12 judges the contrast data $C_k$ having the maximum value in the last as "focused".

The focus processing device 12 recognizes the Z coordinate $Z_k$ of the XYZ stage 1 when the object image data $D_k$ has been taken, from the movement control section 3 through the main control section 15. The focus processing device 12 stores each of the Z coordinates $Z_k$ in a Z-coordinate memory region of the image information memory 13.

When the focus processing device 12 has judged the contrast data $C_k$ indicating the final maximum value as focused, the focus processing device 12 reads out the object image data $D_k$ corresponding to the contrast data $C_k$ from the image capture buffer memory region, and outputs and displays it on the display 14.

In the meantime, there are cases where the object image data $D_k$ of the contrast data $C_k$ indicating the maximum value cannot be retrieved even if the contrast data $C_n$ indicating the maximum value is searched for by successively taking the object image data $D_n$. For example, it cannot be retrieved in the following case.

Figure 6:
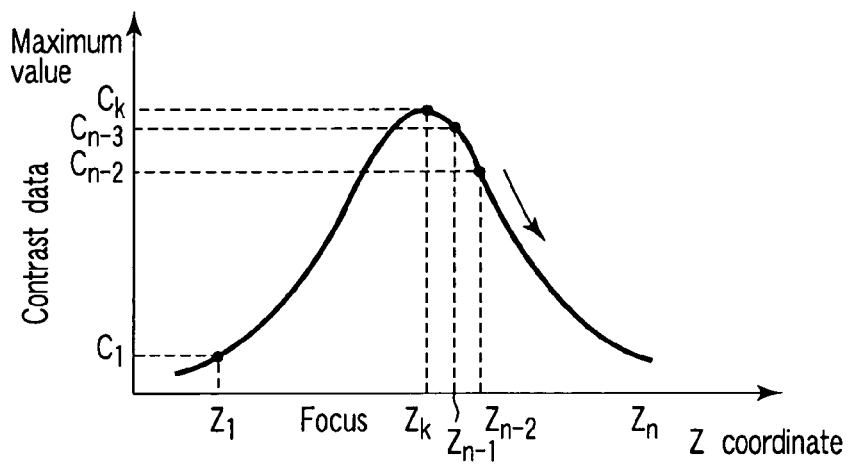
FIG. 6 is a diagram showing change of contrast data with respect to a Z coordinate in the embodiment of the image processing apparatus according to the present invention.

It cannot be retrieved in the case where the Z coordinate of the XYZ stage 1 is located higher than the Z coordinate $Z_k$ at which the object image data $D_k$ having the contrast data $C_k$ indicating the maximum value, for example, it is located at a Z coordinate $Z_{n-3}$ at which the object image data $D_{n-3}$ is taken. In this case, the XYZ stage 1 ascends from the Z coordinate $Z_{n-3}$ which is higher than the Z coordinate $Z_k$ at which the contrast data $C_k$ having the maximum value. Therefore, the formed contrast data $C_{n-3}$, $C_{n-2}$, ..., $C_n$ gradually lower from the contrast data $C_k$ of the maximum value, as shown in FIG. 6.

As in this case, if the contrast data $C_n$ gradually lower at predetermined number of times, the focus processing device 12 judges that the stage has already passed the contrast data $C_k$ of the maximum value, and changes the ascending/descending movement of the XYZ stage 1 to the opposite direction, for example, from the ascending movement to the descending movement. The command of changing the movement direction of the XYZ stage 1, generated from the focus processing device 12, is transmitted to the movement control section 3 through the main control section 15, for example.

Figure 5:
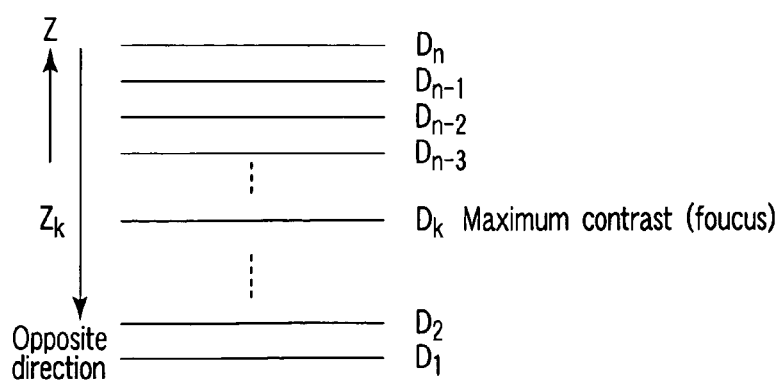
FIG. 5 is a diagram showing a movement of an XYZ stage in a Z direction in the embodiment of the image processing apparatus according to the present invention.

An image signal outputted from the CCD camera 5 during the descending movement of the XYZ stage 1 as shown in FIG. 5 is inputted in the focus processing device 12, and the focus processing device 12 captures a still image at each predetermined timing by the image capture.

The focus processing device 12 renews the maximum value in the same manner as the above with respect to the taken object image data $D_n$, $D_{n-1}$, $D_{n-2}$, $D_{n-3}$, ..., $D_k$, and judges the contrast data $C_k$ which indicates the final maximum value as focused. The object image data $D_k$ is read from the image capture buffer memory region, and displayed on the display 14.

In the meantime, the focus processing device 12 not only captures object image data $D_k$ having the contrast data $D_k$ of the maximum value, but a plurality of object image data within a range of an object field depth including the object image data having the contrast data $C_k$ of the maximum value. The object image data are superposed and displayed on the display 14 as three-dimensional data.

If a defect inspection of a large-size glass substrate 2 of the same type is performed, or if another defective portion on the same large-size glass substrate 2 is inspected, the focus processing device 12 reads the Z coordinate $Z_K$ of the XYZ stage 1 corresponding to the contrast data $C_k$ indicating the maximum value stored in the contrast memory region, and can obtain the focused image data by moving the XYZ stage 1 to the Z coordinate $Z_k$.

Further, the focus processing device 12 reads the Z coordinate $Z_k$, raises or lowers the XYZ stage continuously in the Z direction within a small range including the Z coordinate $Z_K$, and thereby obtains the object image data $D_k$ being the contrast data $C_k$ serving as the maximum value.

Next, the second mode will now be explained.

The same reference numerals $D_n$, $C_n$ and $Z_n$ as in the first mode are used for object image data, contrast data and Z coordinate, respectively.

The focus processing device 12 moves the XYZ stage step by step in the ascending direction at predetermined pitches. The focus processing device 12 captures each object image data $D_n$ acquired by image-taking by the CCD camera 5 for each step movement. The focus processing device 12 determines the Z coordinate of contrast data $C_k$ having the maximum value, from contrast data $C_n$ of the respective object image data $D_n$.

The image processing device 12 moves the XYZ stage 1 to a Z coordinate $Z_k$ at which focusing can be obtained, on the basis of the coordinate $Z_k$ of the contrast data $C_K$ of the maximum value.

After the XYZ stage 1 has been moved, the focus processing device 12 captures the object image data $D_k$ obtained by image-taking by the CCD camera 5, and outputs and displays it on the display 14 in real time.

Further, as an initial operation before acquiring the object image data $D_k$ having the contrast data $C_k$ of the maximum value, the focus processing device 12 raises the XYZ stage 1 by a predetermined distance from its lower limit position, and sets it to a Za coordinate of its initial position being a focus starting position, with the backlash removed.

The main control section 15 sets the first mode or the second mode, sets the ascending/descending speed of the XYZ stage in the first mode, sets the starting position (Z coordinate) of ascent/descent of the XYZ stage 1, sets the pitch of the step movement of the XYZ stage 1 in the second mode, and transmits and receives various commands and data between the focus processing device 12 and the movement control section 3.

Figure 8:
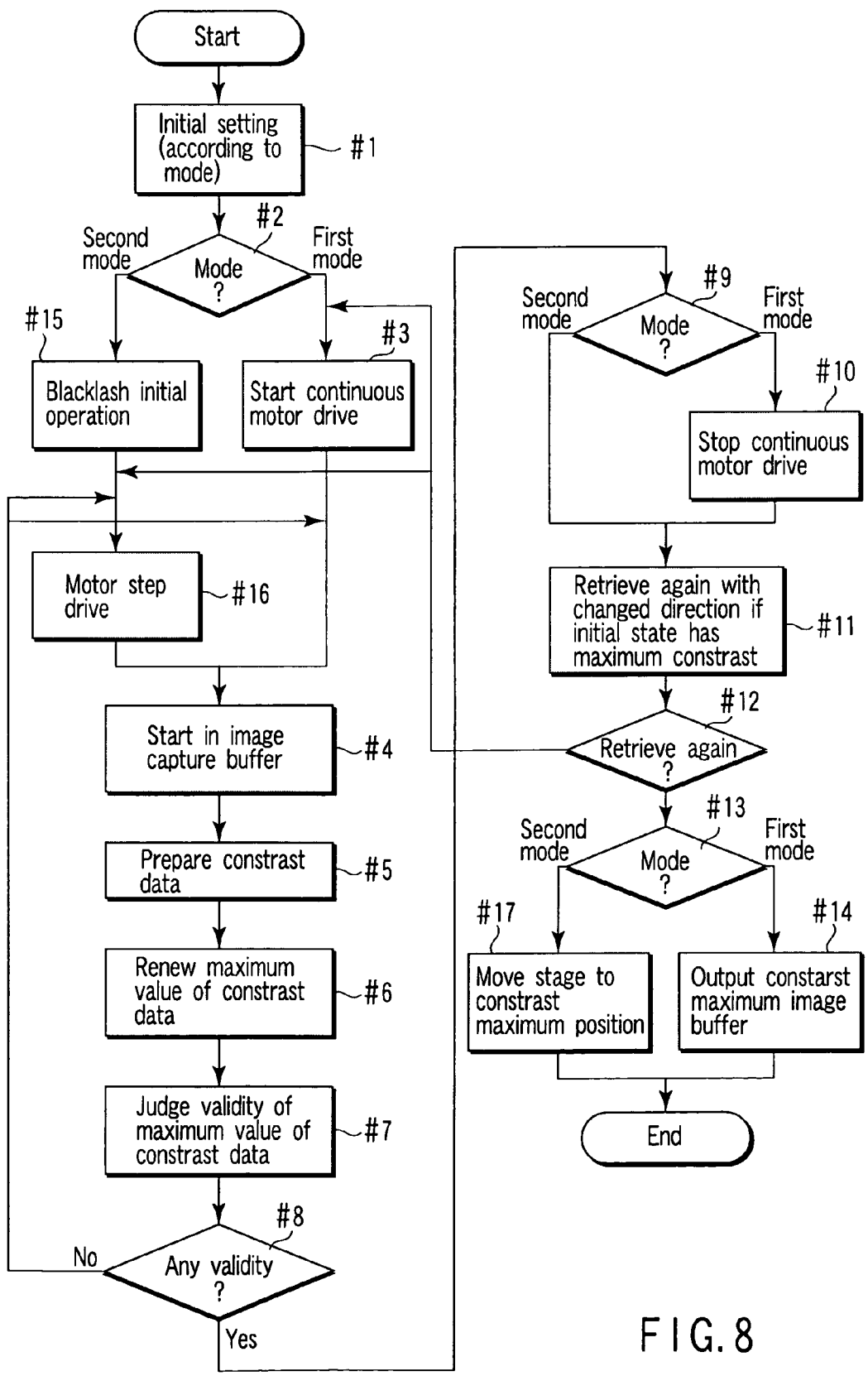
FIG. 8 is a flow chart of obtaining a focused image in the embodiment of the image processing apparatus according to the present invention.

Next, the operation of the apparatus structured as described above will now be described in accordance with a focused image acquisition flow chart shown in FIG. 8.

The main control section 15 performs initial setting in step #1. The initial setting includes setting of the first mode or the second mode, setting of the ascending/descending speed of the XYZ stage in the first mode, setting of the starting position (Z coordinate) of ascent/descent of the XYZ stage 1, and setting of the pitch of the step movement of the XYZ stage 1 in the second mode.

Next, the main control section 15 judges, in step #2, whether the set mode is the first mode or the second mode.

First, the operation when the first mode has been set is explained.

The main control section 15 notifies the movement control section 3 and the focus processing device 12 that the set mode is the first mode. The movement control section 3 transmits a movement command to the XYZ stage 1 to drive the Z-direction motor at a predetermined rotation number and move the XYZ stage 1 in the Z direction.

The XYZ stage 1 starts, in step #3, ascending movement in the Z direction continuously at low and constant speed. In this step, when the XYZ stage 1 has ascended, the movement control section 3 recognizes height information (Z coordinate) of the XYZ stage 1 from the Za coordinate of the initial position.

Simultaneously, the CCD camera 5 takes an image of the large-size glass substrate 2 which is continuously ascending in the Z direction on the XYZ stage 1, and outputs an image signal.

In this state, in step #4, the focus processing device 12 successively captures still images of the large-size glass substrate 2, which have been taken by the CCD camera 5, by the image capture at predetermined timings, as shown in FIG. 2, and stores the first object image data $D_1$ in the image capture buffer memory region of the image information memory 13.

Then, in step #5, the focus processing device 12 forms contrast data $C_1$ of the object image data $D_1$ stored in the image capture buffer memory region, and stores it in the contrast memory region of the image information memory 13.

Next, in step #6, the focus processing device 12 renews the contrast data. In this state, only the contrast data $C_1$ of the object image data $D_1$ is stored, and thus in step #7 the validity as to whether the maximum value (focus) can be obtained from the contrast data $C_1$ stored in the contrast memory region is judged.

The validity of the contrast data is judged as follows. For example, the XYZ stage 1 is raised in the Z direction, and object image data $D_1, D_2, \ldots, D_k, \ldots, D_n$ are successively captured, and contrast data $C_1, C_2, \ldots, C_k, \ldots, C_n$ of the object image data $D_1, D_2, \ldots, D_k, \ldots, D_n$ are formed.

When the contrast data $C_1, C_2, \ldots, C_k, \ldots, C_n$ of the object image data $D_1, D_2, \ldots, D_k, \ldots, D_n$ are plotted with respect to the Z coordinate, a contrast curve C as shown in FIG. 6 is obtained. The contrast curve C shows an arc line, which first rises with ascent of the XYZ stage 1 in the Z direction and falls when it has passed the maximum value.

When the contrast curve C has first changed to be high and then the focus processing device 12 has obtained contrast data $C_n$ which has lowered after the maximum value has been passed, the focus processing device 12 judges that the contrast data has the validity that the maximum value corresponding to the focus position can be obtained.

In the state where the first object image data $D_1$ has been captured, the focus processing device 12 has no previous object image data to be compared. Thus, in step #8, the focus processing device 12 judges that the contrast data $C_1$ has no validity, and returns to step #4.

Next, in step #4, the focus processing device 12 captures a still image when an image of the large-size glass substrate 2 on the ascending XYZ stage 1 is taken by the CCD camera 5, by the image capture, and stores the object image data $D_2$ obtained thereby in the image capture buffer memory region.

Then, in step #5, the focus processing device 12 forms contrast data $C_2$ of the object image data $D_2$ stored in the image capture buffer memory region.

Thereafter, in step #6, the focus processing device 12 compares the contrast data $C_1$ of the previous object image data $D_1$ which has already been stored in the contrast memory region, with the contrast data $C_2$ of the object image data $D_2$ which has been newly stored in this step.

As a result of the comparison, if the contrast data $C_2$ of the newly-stored object image data $D_2$ is greater than the previous contrast data $C_1$, the focus processing device 12 recognizes the contrast data $C_2$ as contrast data of the maximum value, and renews the contrast data $C_2$ of the maximum value.

Then, in step #7, the focus processing device 12 judges the validity of the contrast data again. In the state where two object image data $D_1$ and $D_2$ are stored, the contrast curve C has not yet passed the maximum value and not changed to fall. Therefore, the focus processing device 12 judges that the contrast data has no validity in step #8.

Thereafter, the focus processing device 12 repeats the steps #4 to #8, and captures the object image data $D_1$, $D_2, \ldots, D_k, \ldots, D_n$ in order, and renews the contrast data of the maximum value.

In step #6, the focus processing device 12 compares the previous contrast data with the new contrast data and, if the new contrast data is smaller, judges that it has passed the maximum value of the contrast curve C shown in FIG. 6, and judges that the contrast data has the validity, since the contrast data $C_n$ includes the contrast data $C_k$ indicating the maximum value.

Next, in step #9, the focus processing device 12 judges that the mode is the first mode, and thus proceeds to the step #10, and transmits a command to stop the motor of the XYZ stage 1 to the movement control section 3 through the main control section 15. Thereby, the XYZ stage 1 stops ascending in the Z direction.

There are cases where the object image data $D_k$ of the contrast data $C_k$ having the maximum value cannot be retrieved even if the object image data $D_1, D_2, \ldots, D_k, \ldots, D_n$ are stored successively. In this case, in step 11, the focus processing device 12 judges whether the contrast data continues to lower at predetermined number of times as the result of comparison of the contrast data $C_n$ formed successively in the step #6.

As the result of the comparison, if the contrast data $C_n$ gradually lower continuously at predetermined number of times, the focus processing device 12 judges that the contrast data $C_k$ has already been passed, and transmits a command to change the ascent/descent of the XYZ stage 1 to the opposite direction, for example, from the ascending direction to the descending direction, to the movement control section 3 through the main control section 15.

After the focus processing device 12 performs the step #3 in the opposite direction to the first retrieving direction, the focus processing device 12 repeats the steps #4 to #8 again, captures the object image data $D_1, D_2, \ldots, D_k, \ldots, D_n$ in order during descent of the XYZ stage 1, forms contrast data of the respective object image data $D_1, D_2, \ldots, D_k, \ldots, D_n$, and judges contrast data $C_k$ of the maximum value.

Next, the focus processing device 12 judges that the mode is the first mode, and thus it proceeds to the step #14, and reads the object image data $D_k$ of the contrast data $C_k$ indicating the maximum value from the image capture buffer memory region and outputs and displays it on the display 14.

Simultaneously with this, the focus processing device 12 captures a plurality of object image data including the object image data $D_k$ having the contrast data $C_k$ of the maximum value, from the image capture buffer memory region. The focus processing device 12 can superpose the captured plural image data and output and display them on the display 14 as a three-dimensional image.

Further, in the first mode, when the XYZ stage is lowered in the Z-axis direction continuously at low and constant speed, the focus position of images taken by the CCD camera 5 through the observing optical system 4 moves in the Z direction with respect to the surface of the large-size glass substrate 2 on the XYZ stage 1.

Figure 10:
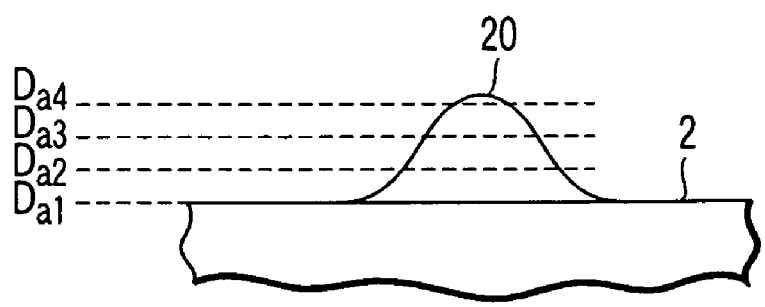
FIG. 10 is an explanatory drawing of using the present invention for formation of the object image data of extend focus in the embodiment of the image processing apparatus of the present invention.

As described above, by taking images of the large-size glass substrate 2 by the CCD camera 5 while moving the XYZ stage 1 in the Z-axis direction, object image data $D_{a1}$, $D_{a2}$, $D_{a3}$ and $D_{a4}$ in respective Z positions in a defective portion 20 on the large-size glass substrate 2 as shown in FIG. 10 can be obtained. The number of object image data to be captured can be set to any number.

Therefore, the focus processing device 12 can form object image data of extend focus, by positioning the object image data $D_{a1}$, $D_{a2}$, $D_{a3}$ and $D_{a4}$ and displaying them in a superposed state. From the extend-focus object image data, the defective portion 20 on the large-size glass substrate 2 can be viewed in detail.

Next, the operation of the second mode will now be described.

The main control 15 notifies the movement control section 3 and the focus processing device 12 that the mode is the second mode. Together with this, the main control section 15 transmits, to the movement control section 3, a command to raise the XYZ stage 1 by a predetermined distance from its lower limit position and position it to its initial position (Za coordinate), with the backlash removed.

In step #15, the movement control section 3 raises the XYZ stage 1, for example, and sets it to the Za coordinate of the initial position.

Next, in step #16, the movement control section 3 transmits, to the XYZ stage 1, a movement command to step-rotate the Z-directional motor step by step at a predetermined rotation angle. Thereby, the XYZ stage 1 step-moves in the ascending direction at predetermined pitches.

For each step movement of the XYZ stage 1, the CCD camera 5 takes an image of the large-size glass substrate 2 placed on the XYZ stage 1, and outputs an image signal thereof.

Thereafter, the focus processing device 12 repeats the steps #4 to #8 in the same manner as the above, captures successively the object image data $D_n$ each time the stage 1 step-moves by a predetermined pitch, and forms contrast data $C_n$ of each object image data $D_n$.

The focus processing device 12 compares the previous contrast data with the contrast data $C_n$ of the newly captured object image data, and recognizes the greater contrast data $C_n$ as the contrast data $C_n$ of the maximum value and renews the contrast data.

Next, the focus processing device 12 performs processing of steps #9 and #11 to #13 in the same manner as the above, and proceeds to step #17. In this process, the operation proceeds from step #9 to step #11, since the XYZ stage 1 stops after step movement in the Z direction.

In step #17, the focus processing device 12 reads the Z coordinate $Z_k$ corresponding to the contrast data $C_k$ of the maximum value from the Z-coordinate memory region, and transmits the Z coordinate $Z_k$ to the movement control section 3 through the main control section 3.

Figure 7:
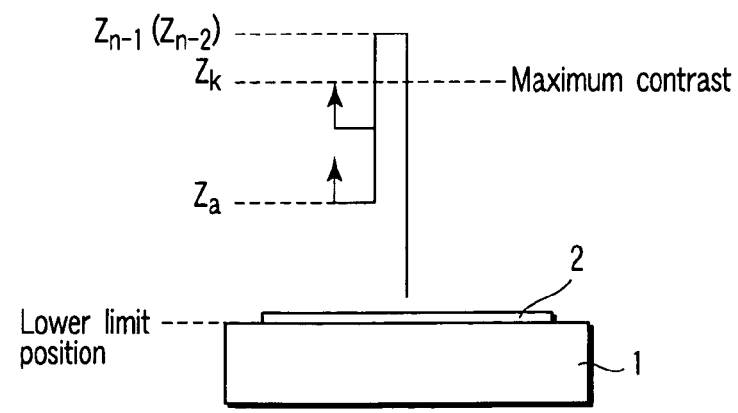
FIG. 7 is a diagram showing a backlash operation in the embodiment of the image processing apparatus according to the present invention.

The movement control section 3 controls and moves the XYZ stage 1 to the Z coordinate $Z_k$. In this control, when the movement control section 3 performs backlash operation as shown in FIG. 7, the movement control section 3 lowers the XYZ stage 1 from the current Z coordinate ($Z_{n-1}$ or $Z_{n-2}$) to be lower than the Z coordinate $Z_k$ corresponding to the contrast data $C_k$ of the maximum value.

For example, it lowers the XYZ stage 1 to the Z coordinate $Z_{k-2}$ several pitches before the current coordinate, or to the initial position $Z_a$. Thereafter, the XYZ stage 1 is raised again to be backlashed, and moved to the Z coordinate $Z_k$. When the XYZ stage 1 is set to the Z coordinate $Z_k$, the CCD camera 5 takes an image of the large-size glass substrate 2, and obtains focused object image data $D_k$.

Figure 9:
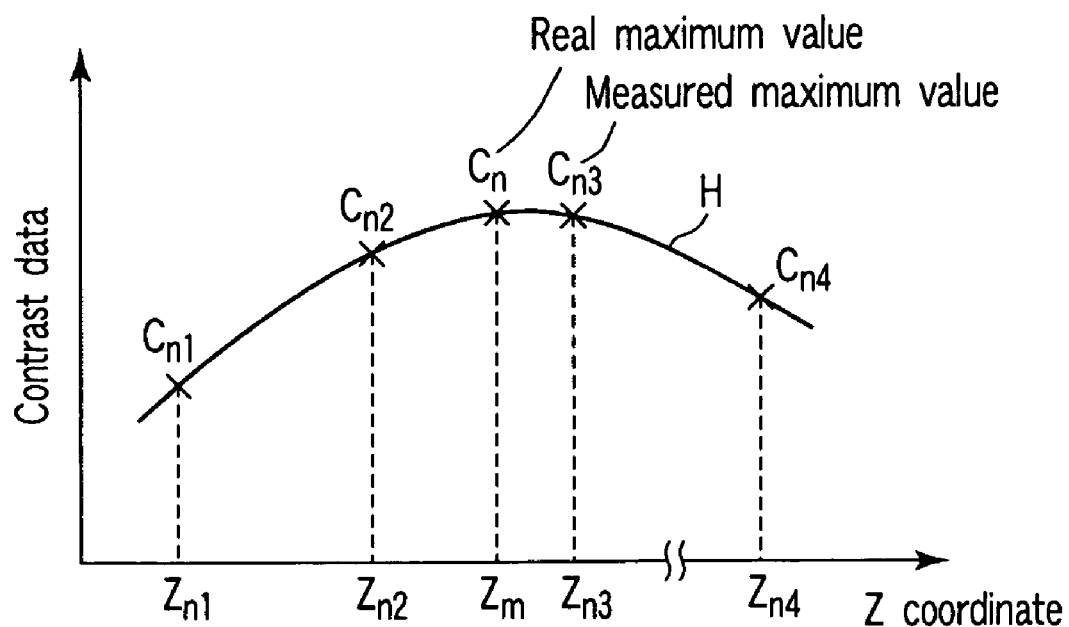
FIG. 9 is a diagram showing a method of obtaining contrast data of a maximum value by a interpolative curve in the embodiment of image processing apparatus of the present invention.

The XYZ stage 1 can be moved to the Z coordinate $Z_k$, at which the object image data $D_k$ of the contrast data $C_k$ of the maximum value, by the following method. As shown in FIG. 9, Z coordinates $Z_{n1}$, $Z_{n2}$, $Z_{n3}$ and $Z_{n4}$ and contrast data $C_{n1}$, $C_{n2}$, $C_{n3}$ and $C_{n4}$ of respective predetermined pitches are formed.

Then, an interpolative curve H of the contrast data $C_{n1}$, $C_{n2}$, $C_{n3}$ and $C_{n4}$ is obtained. The contrast data $C_m$ of the real maximum value can be obtained from the interpolative curve H of the contrast data $C_{n1}$, $C_{n2}$, $C_{n3}$ and $C_{n4}$.

A high-accurate focusing can be obtained by setting the XYZ stage 1 to the Z coordinate $Z_m$ corresponding to the contrast data $C_m$ of the real maximum value.

The XYZ stage 1 is set to the Z coordinate ($Z_k$ or $Z_m$) corresponding to the contrast data ($C_k$ or $C_m$) of the maximum value. In this step, the focus processing device 12 captures an image signal outputted from the CCD camera 5, and outputs and displays focused object image data $D_k$ real time on the display 14.

As described above, according to the above embodiment, in the first mode, the XYZ stage 1 on which the large-size glass substrate 2 is placed is continuously raised at low and constant speed, the contrast data $C_k$ of the maximum value is retrieved from the object image data $D_n$ successively obtained by image-taking by the CCD camera 5, and the focused object image data $D_k$ is read from the image capture buffer memory and can be displayed on the display 14.

In setting to the focused position, the XYZ stage 1, CCD camera 5 and the focus processing device 12 can be operated independently, with no need of checking their operations each other. Therefore, the focus processing device 12 have only to retrieve the object image data $D_k$ of the contrast data $C_k$ of the maximum value, and thus the processing amount thereof can be reduced. Consequently, the time for retrieving the contrast data $C_k$ indicating the maximum value, that is, the time required for retrieving the focused object image data $D_k$ can be reduced.

Further, when the focused object image data $D_k$ has been retrieved, the object image data $D_k$ is read from the image capture buffer memory region and outputted and displayed on the display 14. Therefore, at the time of retrieving the focused object image data $D_k$, the object image data $D_k$ can be immediately viewed on the display 14. In this case, since the focused object image data $D_k$ has been stored in the image capture buffer memory region, even if the XYZ stage 1 is located in a position higher than the Z coordinate $Z_k$, the stage does not have to return to the Z coordinate $Z_k$ to obtain the focused object image data $D_k$. This can also reduce time which the XYZ stage 1 requires to return.

Therefore, it can reduce the time of defect inspection for large-size glass substrate 2 and semiconductor wafers used for LCDs or PDPs. This can reduce tact time of manufacturing of LCDs or PDPs, and semiconductor wafers, etc.

If the device judges that the contrast data which have been successively captured gradually lower continuously at predetermined number of times, it judges that the contrast data $C_k$ of the maximum value cannot be found, and changes the ascent/descent of the XYZ stage 1 to the opposite direction. Thereby, even if the starting position of ascent/descent of the XYZ stage 1 before retrieval of the focus is located above or below the focusing position, it can securely retrieve the object image data $D_k$ of the contrast data $C_k$ of the maximum value.

The focus processing device 12 captures a plurality of object image data, within the range of the object field depth including the object image data $D_k$ of the contrast data $C_k$ of the maximum value. An extent focus object image can be formed by superposing the plural object image data on each other. This enables defect inspection in a layer direction of the large-size glass substrate or semiconductor wafer, on the basis of the three-dimensional object image data.

Further, if defect inspection of the large-size glass substrates in unit of the predetermined number is performed, the XYZ stage is moved to a Z coordinate $Z_k$ corresponding to the contrast data $C_k$ of the maximum value already stored in the inspection of the first large-size glass substrate 2, or the XYZ stage 1 is continuously raised/lowered within a small Z-directional range including the Z coordinate $Z_k$, and the object image data $D_k$ being the contrast data $C_k$ serving as the maximum value. This can further reduce the time for obtaining the object image data $D_k$ of the contrast data $C_k$ of the maximum value again.

In the meantime, in the case of the second mode, object image data $D_n$ is captured by the image capture from the CCD camera 5 each time the XYZ stage 1 is moved by a predetermined pitch, the $Z_k$ coordinate of the contrast data $C_k$ of the maximum value is obtained from the contrast data $C_m$ of the object image data $D_m$, and the XYZ stage 1 is moved to the position of the $Z_k$ coordinate and focused.

Thereby, the step movement of the XYZ stage 1 and the operation of acquiring the object image data $D_k$ in the CCD camera 5 and the focus processing device 12 can be performed separately, and thus the time for retrieving the focused object image data $D_k$ can be reduced.

Since the XYZ stage 1 is moved to the Z coordinate $Z_k$, at which the object image data $D_k$ of the contrast data $D_k$ of the maximum value is obtained, and the object image data $D_k$ obtained by image-taking by the CCD camera 5 is outputted and displayed on the display 14, it is possible to view a real-time image of the large-size glass substrate 2 and semiconductor wafer, etc.

The XYZ stage 1 is backlashed, and the XYZ stage 1 is set to the Z coordinate $Z_k$ corresponding to the contrast data $C_k$ of the maximum value. Thereby, even if the XYZ stage 1 is mechanically unsecure, the Z-directional position of the XYZ stage 1 can be set with high accuracy, without being shifted from the Z coordinate $Z_k$.

The present invention is not limited to the above embodiment, but can be variously modified at the stage of being carrying out, within the range not deviating from the gist.

For example, the CCD camera 5 can be replaced by an analogue image-pickup device, such as an industrial television camera. In the case where it is replaced by an industrial television camera, an analogue image signal outputted from the industrial television camera is converted into a digital signal by an A/D converter and transmitted to the focus processing device 12.

Even in the case where the objective lens of the CCD camera 5 is replaced by another one having a different magnifying power, the object image data $D_k$ of the contrast data $C_k$ of the maximum value can be retrieved with a short time. In the case of changing the objective lens 6, although the brightness of the object image data changes, it can be dealt with by adjusting the illumination of the lighting device 9 which illuminates the large-size glass substrate 2.

With respect to the XYZ stage 1 and the CCD camera 5, the distance between the large-size glass substrate 2 and the CCD camera 5 is changed by raising/lowering the XYZ stage 1. However, the distance between the large-size glass substrate 2 on the XYZ stage 1 and the CCD camera 5 can be changed by raising/lowering the CCD camera 5, or raising/lowering the XYZ stage 1 and the CCD camera 5 each other.

With respect to acquisition of image data from the CCD camera 5, an image signal outputted from the CCD camera 5 may be taken in at predetermined time intervals in the state where the CCD camera 5 is taking an image, or an image signal may be taken in by operating the CCD camera 5 to take an image at predetermined time intervals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a stage on which an object is placed;
   an image taking device which takes an image of the object;
   a movement control section which varies a distance between the stage and the image taking device;
   a focus processing device which captures image data one by one from the image taking device at each predetermined timing while varying the distance between the stage and the image taking device by the movement control section, generates a contrast data of the captured image data, judges whether the contrast data has a maximum, judges the image data of the object in which contrast data of the image data has a maximum as focused, and transmits a command to stop the movement control section when the image data is judged as maximum;
   an image information memory which stores the image data of the object judged as focused; and
   a display section which displays the image data of the object judged as focused, from the image information memory.

2. An image processing apparatus according to claim 1, wherein
   the movement control section continuously varies the distance between the stage and the image taking device at constant speed, and
   the focus processing device obtains the image data, which is outputted from the image taking device at predetermined timing, while the distance between the stage and the image taking device is varied continuously at constant speed.

3. An image processing apparatus according to claim 2, wherein
   the focus processing device captures the image data, outputted from the image taking device, as a still image at each predetermined timing.

4. An image processing apparatus according to claim 1, wherein
   the movement control section varies the distance between the stage and the image taking device at predetermined pitches,
   the focus processing device captures the image data, which is acquired from the image taking device when the distance between the stage and the image taking device is varied at predetermined pitches, at timing of the predetermined pitches.

5. An image processing apparatus according to claim 1, wherein
   the focus processing device captures the image data from the image taking device at each predetermined timing, and compares the contrast data of the respective image data of the former and latter timings, and judges the image data of the object corresponding to the contrast data having a maximum value as focused.

6. An image processing apparatus according to claim 1, wherein
   the focus processing device renews a maximum value of the contrast data while comparing the contrast data of the respective image data captured from the image taking device at successive timings, and obtains the maximum value of the contrast data.

7. An image processing apparatus according to claim 1, wherein
the focus processing device stores the image data corresponding to a maximum value of the contrast data in the image information memory.

8. An image processing apparatus according to claim 1, wherein
the focus processing device stores a plurality of the image data including the image data corresponding to the contrast data of a maximum value in the image information memory.

9. An image processing apparatus according to claim 1, wherein the focus processing device reads the plurality of the image data stored in the image information memory, and superpose the image data and display them on the display section.

10. An image processing apparatus according to claim 1, wherein
the focus processing device sets a sampling region to a part of the image data of the object captured from the image taking device, and forms the contrast data to the sampling region.

11. An image processing apparatus according to claim 10, wherein
the sampling region sets a linear sampling pattern on two diagonal lines running through a center of the image data of the object.

12. An image processing apparatus according to claim 10, wherein
the sampling region sets a sampling pattern in plural parts of the image data of the object.

13. An image processing apparatus according to claim 1, wherein
the focus processing device stores a Z coordinate corresponding to the contrast data of a maximum value in the image information memory, and reads the Z coordinate from the image information memory when a focusing operation on the same object or associated with the object of the same type is performed, and provides a change command to the movement control section.

14. An image processing apparatus according to claim 1, wherein
the focus processing device reads a Z coordinate corresponding to the contrast data of a maximum value stored in the image information memory in advance, and provides to the movement control section with a command to change the distance between the stage and the image taking device according to the Z coordinate, and obtains the image data of the object, the contrast data of which has a maximum value.

15. An image processing apparatus according to claim 1, wherein
the focus processing device reads a Z coordinate corresponding to the contrast data of a maximum value stored in the image information memory in advance, provides to the movement control section with a command to change the distance between the stage and the image taking device within a small range including the Z coordinate, and obtains the image data of the object, the contrast data of which has a maximum value, within the small range.

16. An image processing apparatus according to claim 1, wherein
the focus processing device captures the image data from the image taking device at predetermined timing, compares the contrast data of the respective image data at successive timings and, if the contrast data of the latter image data is lower than the former image data at predetermined successive number of times, the focus processing device provides the movement control section with a command to change a direction of changing the distance between the stage and the image taking device to the opposite direction, and captures the image data from the image taking device at each predetermined timing again.

17. An image processing apparatus according to claim 1, wherein
the focus processing device is inputted with an image signal outputted from the image taking device, while continuously varying the distance between the stage and the image taking device, captures a still image by an image capture at each predetermined timing, and stores the still image in an image capture buffer memory region of the image information memory.

18. An image processing apparatus according to claim 1, wherein
the focus processing device successively obtains respective contrast data of the object image data captured at predetermined timings while varying the distance between the stage and the image taking device, determines the contrast data having the maximum from the respective contrast data, and stores the object image data corresponding to the contrast data having the maximum in an image capture buffer memory region of the image information memory.

19. An image processing apparatus according to claim 1, wherein
the movement control section moves either the stage or the image taking device by predetermined pitch intervals, and the focus processing device captures the object image data from the image taking device for each step movement, obtains a Z coordinate at which the contrast data has a maximum value, from the object image data, moves either the stage or the image taking device, and outputs and displays the image data of the object picked up by the image taking device on the display section.

20. An image processing apparatus according to claim 1, wherein the focus processing device moves either the object or the image taking device by predetermined pitch intervals and forms the contrast data of the respective object image data, obtains an interpolative curve from a plurality of the contrast data including a maximum value, obtains a Z coordinate of the maximum value from the interpolative curve, moves either of the stage or the image taking device to the Z coordinate of the maximum value, and outputs and displays the object image data picked up by the image taking device on the display section.

21. An image processing apparatus according to claim 19 or 20, wherein
the movement control section moves either the object or the image taking device to be lower than the Z coordinate corresponding to the maximum value and thereafter moves it in the opposite direction to backlash it, and moves either the object or the image taking device to the Z coordinate corresponding to the maximum value.

* * * * *